United States Patent
Ramachandran et al.

(10) Patent No.: US 8,665,750 B2
(45) Date of Patent: Mar. 4, 2014

(54) METHODS, DEVICES, AND COMPUTER PROGRAM PRODUCTS FOR AUDITING AND REPAIRING A WIRELESS TELECOMMUNICATIONS NETWORK CONFIGURATION

(75) Inventors: Jayaraman Ramachandran, Plainsboro, NJ (US); Justin Kirsten, Pottstown, PA (US); Robert Sharp, King of Prussia, PA (US)

(73) Assignee: AT&T Mobility II LLC, Atlanta, GA (US)

( * ) Notice: Subject to any disclaimer, the term of this patent is extended or adjusted under 35 U.S.C. 154(b) by 406 days.

(21) Appl. No.: 12/971,635

(22) Filed: Dec. 17, 2010

(65) Prior Publication Data

US 2012/0155323 A1  Jun. 21, 2012

(51) Int. Cl.
*H04L 12/28* (2006.01)
(52) U.S. Cl.
USPC .......................................................... 370/254
(58) Field of Classification Search
USPC .......... 370/254, 312; 455/404.1, 404.2, 456.1
See application file for complete search history.

(56) References Cited

U.S. PATENT DOCUMENTS

| | | | | |
|---|---|---|---|---|
| 6,233,449 B1 * | 5/2001 | Glitho et al. | ................... | 455/423 |
| 7,287,246 B2 * | 10/2007 | Tan et al. | ...................... | 717/129 |
| 7,606,165 B2 * | 10/2009 | Qiu et al. | ...................... | 370/252 |
| 7,961,594 B2 * | 6/2011 | Alon et al. | ..................... | 370/216 |
| 2010/0003954 A1 * | 1/2010 | Greene et al. | ............. | 455/404.1 |
| 2012/0058775 A1 * | 3/2012 | Dupray et al. | ............. | 455/456.1 |

* cited by examiner

*Primary Examiner* — Dang Ton
*Assistant Examiner* — Nourali Mansoury
(74) *Attorney, Agent, or Firm* — Parks IP Law LLC; Jennifer P. Medlin, Esq.

(57) ABSTRACT

A wireless telecommunications network configuration is audited and repaired. Configuration data is received, representing a current configuration of network elements within the network. The current configuration indicates how network elements are configured within the network or routing and handling communications within the network. Fault and performance data is received representing a current level service quality of the network. The current configuration data is compared to a signature configuration of the network, the signature configuration representing how network elements should be configured within the network such that communications are routed and handled for at least one of optimal performance, disaster recovery, and operation continuity. A determination is made, based on the comparison and the collected fault and performance data, whether repairs are needed to the current configuration of the network. Repair information is provided for the network elements needing repairs based on a determination that repairs are needed.

12 Claims, 3 Drawing Sheets

METHODS, DEVICES, AND COMPUTER PROGRAM PRODUCTS FOR AUDITING AND REPAIRING A WIRELESS TELECOMMUNICATIONS NETWORK CONFIGURATION

TECHNICAL FIELD

The present disclosure relates generally to telecommunications, and, more particularly, to auditing and repairing a configuration of a telecommunications network.

BACKGROUND

When a wireline 911 call is initiated, the call is directed to an assigned local Public Safety Answering Point (PSAP). The PSAP can be controlled by, e.g., a federal entity, a state entity, a county entity, or a city entity, and is responsible for answering emergency calls and dispatching emergency assistance from police, fire, ambulance, and/or other emergency services.

The PSAP answers the call and receives an inbound telephone number or Automatic Number Identification (ANI) information. This number is used to query an Automatic Location Identification (ALI) database to match it with the address corresponding to the location of the calling party, and the location information and inbound telephone number are forwarded to the assigned PSAP. The PSAP can deliver both the number and the location to the appropriate emergency service (e.g., fire, police and/or ambulance) for dispatch.

The above scenario works well when the 911 call originates from a wireline device (e.g., a wireline phone at a residence) because every wireline number is associated with a unique, static address. For mobile devices, such as mobile phones, however, the locations of the users change as the users of the mobile devices travel to different locations. Accordingly, the FCC has mandated the use of a technology known as enhanced 911 (E911) to enable mobile devices to process 911 emergency calls and enable emergency services to determine the location of the calling party.

Prior to 1996, wireless 911 callers would have to access their service providers to get verification of subscription service before the call could be routed to a PSAP. In 1996, the FCC mandated that a 911 call must be routed directly to a PSAP without receiving verification of service from a specific mobile operator. The FCC further mandated that the call must be handled by any available carrier even if the carrier is not the calling party's home carrier. Under the FCC's rules, all mobile phones must be capable of supporting 911 call processing.

The FCC has proposed a phased rollout of E911. In 1998, Phase I was implemented and required that mobile operators identify the originating phone number and the location of the base station or cell associated with the mobile device. Phase I E911 rules required a callback number for the PSAP dispatcher to use if the call is disconnected or otherwise compromised.

In 2001, Phase II was implemented and required that each mobile operator in the United States offer handset-based or network-based location detection capability so that the calling party's location is determined with high confidence according to the geographic location of the mobile device within 300 meters accuracy for network based solutions. The FCC refers to this as Automatic Location Identification (ALI). Phase II E911 rules provide a more accurate location for the dispatcher to use than just the site location provided in Phase I.

Communication service providers strive to provide E911 and location-based services reliably. Proper network configuration is an important and necessary function of ensuring service quality of E911 and location-based services in any mobility network.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the present disclosure.

According to an exemplary embodiment, a method is provided for auditing and repairing a wireless telecommunications network configuration. Current configuration data representing a configuration of network elements within the network is received. Fault and performance representing a current level of service quality of the network is also received. The current configuration data is compared to a signature configuration of the network. The signature configuration represents how network elements should be configured within the network such that communications are routed and handled for at least one of optimal performance, disaster recovery, and operation continuity. A determination is made, based on the comparison and the collected fault and performance data, whether repairs are needed to the current configuration of the network. Repair information is provided for the network elements needing repairs based a determination that repairs are needed.

According to another embodiment, a device is provided for auditing and repairing a configuration of a wireless telecommunications network. The device includes an interface for receiving configuration data representing a current configuration of network elements within the network. The interface also receives fault and performance data representing a current level of service quality of the network. The device also includes a processor for comparing the current configuration data to a signature configuration of the network. The signature configuration represents how network elements should be configured within the network such that communications are routed and handled for at least one of optimal performance, disaster recovery, and operation continuity. The processor determines, based on the comparison and the collected fault and performance data, whether repairs are needed to the current configuration of the network. The processor provides repair information for the network elements needing repairs based on a determination that repairs are needed According to another embodiment, a computer program product includes a storage medium upon which instructions are recorded that, when executed by a processor, perform a method for auditing and repairing a wireless telecommunications network configuration. The method includes receiving current configuration data of network elements within the network. The current configuration indicates how network elements are configured within the network. The method further includes receiving fault and performance data representing a current level of service quality of the network. The method further includes comparing the current configuration data to a signature configuration of the network. The signature configuration represents how network elements should be configured within the network such that communications are routed and handled for at least one of optimal performance, disaster recovery, and operation continuity. The method further includes determining, based on the comparison and the collected fault and performance data, whether repairs are needed to the current configuration of the network. The method further includes providing repair information for the network elements needing repairs based on a determination that repairs are needed.

DETAILED DESCRIPTION

Figure 1:
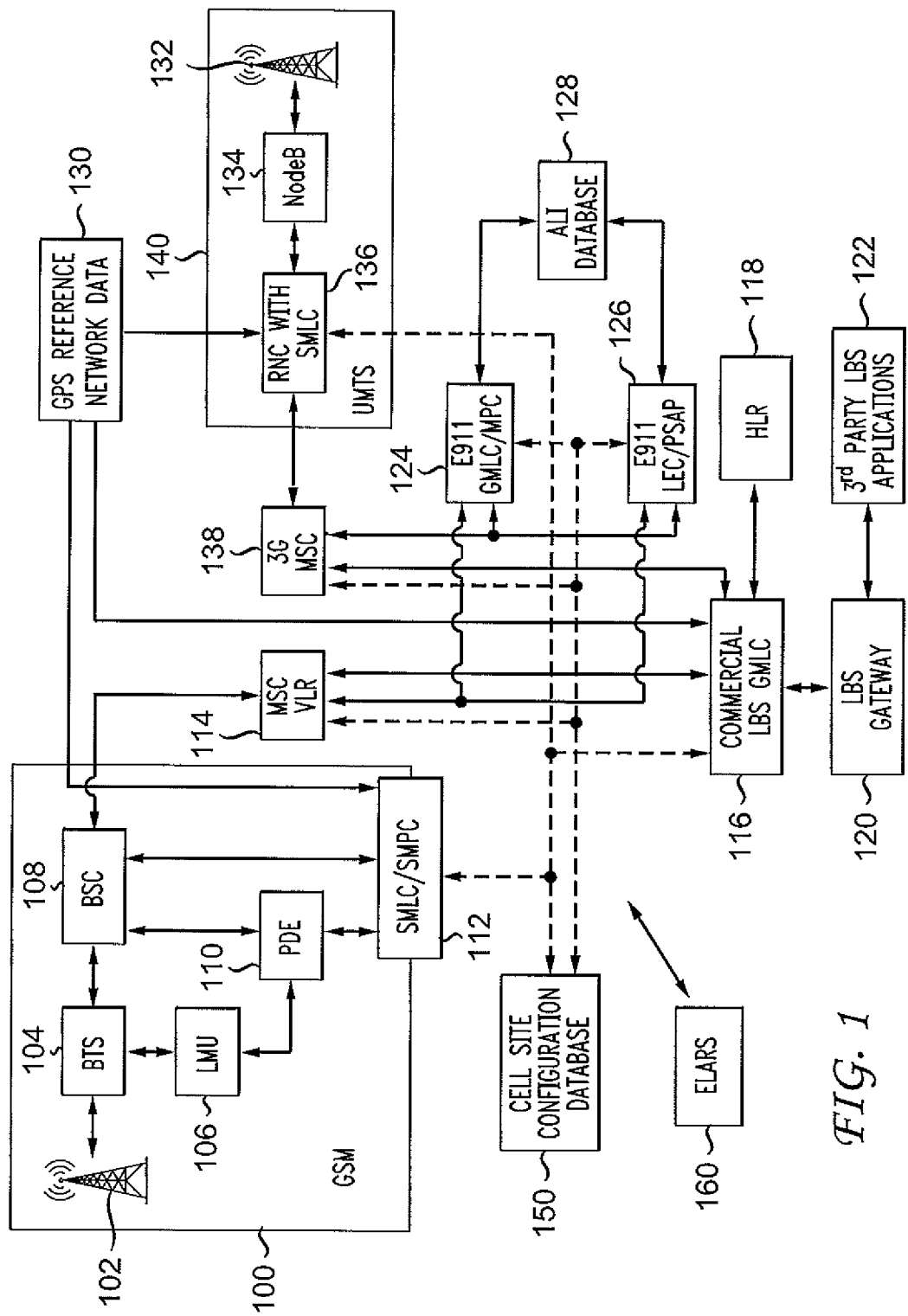
FIG. 1 illustrates a wireless network in which exemplary embodiments may be implemented.

Detailed exemplary embodiments are disclosed herein. It must be understood that the embodiments described and illustrated are merely examples that may be embodied in various and alternative forms, and combinations thereof. As used herein, the word "exemplary" is used expansively to refer to embodiments that serve as examples or illustrations. The figures are not necessarily to scale and some features may be exaggerated or minimized to show details of particular components. Specific structural and functional details disclosed herein are not to be interpreted as limiting.

According to exemplary embodiments, degradation in service quality is detected and corrected, and contingencies for disaster recovery and business continuity are provided for by auditing and repairing a network configuration. The configuration of a wireless network providing location-based services (E911/LBS) is validated, and the configurations of network elements are automatically repaired to restore the health of the network. E911/LBS includes both E911 and commercial location-based applications. By correcting for degradations in service quality, the level of service quality mandated by the FCC, E911 Phase 2, may be provided. Also, the quality of other location-based services is improved. In addition, disaster recovery and business continuity can be provided for.

According to exemplary embodiments, an E911/LBS Auditing and Repair System (ELARS) tool automatically identifies configuration errors that deviate from a standard configuration, also referred to herein as signature configuration. The ELARS tool enables self-checking and self-configuration of network elements, automated validation of physical connections between network elements, and automatic detection of configurations that can cause potential outages in the form of calls that may route incorrectly. The ELARS tool may identify and repair E911/LBS configurations that can cause potential outages in the form of calls that may route incorrectly, location errors, incomplete configuration, or loss of redundant paths for location services.

The embodiments described herein may be implemented in wireless networks that use exemplary telecommunications standards, such as Global System for Mobile communications (GSM) and Universal Mobile Telecommunications Systems (UMTS). It should be understood, however, that the embodiments may be implemented in wireless networks that use any existing or yet to be developed telecommunications technology. Some examples of other suitable telecommunication technologies include, but are not limited to, networks utilizing Time Division Multiple Access (TDMA), Frequency Division Multiple Access (FDMA), Wideband Code Division Multiple Access (WCDMA), Orthogonal Frequency Division Multiplexing (OFDM), Long Term Evolution (LTE), and various other 2G, 2.5G, 3G, 4G, and greater generation technologies. Examples of suitable data bearers include, but are not limited to General Packet Radio Service (GPRS), Enhanced Data rates for Global Evolution (EDGE), the High-Speed Packet Access (HSDPA) protocol family, such as High-Speed Downlink Packet Access (HSDPA), Enhanced Uplink (EUL) or otherwise termed High-Speed Uplink Packet Access (HSDPA), Evolved HSPA (HSPA+) and various other current and future data bearers.

FIG. 1 illustrates a wireless communications network in which a system for auditing and repairing a network configuration may be implemented according to an exemplary embodiment. The network shown in FIG. 1 includes two radio access networks (RAN). A first RAN 100, illustrated in the upper left hand portion of FIG. 1, is dedicated to GSM-based network access. A second RAN 140, illustrated in the upper right hand portion of FIG. 1, is dedicated to UMTS-based network access. The subject disclosure is not limited to the illustrated embodiments for GSM and UMTS network access. Other access technologies are contemplated, such as LTE, as described above. The first RAN 100 is described immediately below.

The first RAN 100 includes one or more base transceiver stations (BTS) 104 for communicating with mobile communication devices. Although not shown for simplicity of illustration, it will be appreciated that the mobile communication devices may include, for example, mobile phones, portable computers with integrated, external, removable network access cards, etc. The BTS 104 is the terminating node for the radio interface in the first RAN. The BTS 104 can include one or more transceivers 102 and can be responsible for ciphering of the radio interface.

The BTS 104 is in communication with a base station controller (BSC) 108. The BSC 108 is configured to allocate radio resources to the mobile communication devices in communication with the BTS 104, administer frequencies, and control handovers between BTS's. Although illustrated as a distinct element, the BSC 108 functions can be incorporated in the BTS 104.

The BTS 104 is also in communication with a Location Measurement Unit (LMU) 106, which is, in turn, in communication with a Position Determination Entity (PDE) 110. The PDE 110 calculates the position of mobile communication devices using measurements taken by the mobile device and/or the LMU 106. The BSC 108 is also in communication with the PDE 110 and a Serving Mobile Location Center (SMLC)/Serving Mobile Positioning Center (SMPC) 112. The SMLC/SMPC 112 determines the locations of the mobile devices based on data from the PDE 110 and data from a location-determining system, e.g., GPS system 130. Although the description below is directed to a GPS system, it should be appreciated that any type of location-determining system may be used. The GPS system 130 may include GPS transceivers that are in communication with the mobile devices for obtaining information indicating the locations of the mobile devices. The SMLC/SMPC 112 provides location information back to the BSC 108, and the BSC 108 provides the location information to a Mobile Switching Center (MSC) 114.

The MSC 114 is configured to function as a telecommunications switch. When the MSC 114 receives a communication from the BSC 108 and recognizes the communication as an emergency or location-based communication from a mobile device, the MSC 114 retrieves location information for the mobile device from the BSC 108.

The MSC 114 is also in communication with location databases, such a visiting location register (VLR) that may be colocated with the MSC 114, and a home location register (HLR) 118. The VLR can be logically associated with the MSC 114 as illustrated or can be a separate network element. The VLR is a database configured to store all subscriber data that is required for call processing and mobility management for mobile subscribers that are currently located in an area controlled by the VLR.

The HLR 118 is a database configured to provide routing information for mobile terminated (MT) calls and various messaging communications. The HLR 118 is also configured to maintain subscriber data that is distributed to the relevant VLR through the attach process and mobility management procedures, such as location area and routing area updates.

For providing location-based services, the HLR 118 is in communication with the MSC 114 and the VLR via a Commercial Location-Based Service (LBS)/Gateway Mobile Location Center (GMLC) 116. The Commercial LBS GMLC 116 communicates with the HLR 118 to acquire user information. The Commercial LBS GMLC 116 also communicates with and one or more third party LBS applications 122 via a LBS Gateway 120 to provide location-based services to mobile devices communicating with the network, such as navigational services, fleet tracking, etc.

For providing emergency services to the mobile devices, the MSC 114 is in communication with an E911 GMLC/Mobile Positioning Center (MPC) 124 and an E911 Local Exchange Carrier (LEC)/PSAP 126. The E911 GMLS/MPC 124 and the E911 LEC/PSAP 126 communicate with an ALI database (ALI DB) 128 containing information representing a caller's location. The E911 GMLC/MPC 124 and the E911 LEC/PSAP 126 match a number of an inbound call, e.g., an inbound telephone number or ANI information, to a corresponding location of the caller stored in the ALI DB 128 and then deliver both the number and the location to the appropriate emergency service, e.g., fire, police, and or ambulance, for dispatch.

The second RAN 140, illustrated in the upper right hand portion of FIG. 1, is dedicated to UMTS-based network access and is now described. Mobile communication devices, such as mobile phones and portable computers, may communicate with the RAN 140 via one or more Node Bs 134. The Node B 134 is the terminating node for the radio interface in the second RAN 140. Each Node B 134 can include one or more transceivers 132 for transmission and reception of data to and from the mobile devices across the radio interface. Each Node B 134 is configured to apply codes to describe channels in a CDMA-based UMTS network. Generally, the Node B 134 performs similar functions for the UMTS network that the BTS 104 performs for the GSM network.

The Node B 134 is in communication with a radio network controller (RNC) 136. The RNC 136 is configured to allocate radio resources to the mobile devices, administer frequencies, and control handovers between Node B's 134. Generally, the RNC 136 performs similar functions for the UMTS network as the BSC 108 performs for the GSM network.

As shown in FIG. 1, the RNC 136 includes an SMLC for determining a location of the mobile device based on data from the GPS system 130. As an alternative, the SMLC may be included as a distinct element. The RNC 136 is in communication with a 3G MSC 138, which performs similar functions as the MSC 114. Upon receipt of an emergency or location-based services call from a mobile device, the 3G MSC 138 communicates with the RNC 136 to obtain information regarding the location of the mobile device.

The 3G MSC 138 is also in communication with the Commercial LBS GMLC 116, the E911 GMLS/MPC 124, and the E911 LEC/PSAP 126, which perform the same functions for the UMTS network as described above for the GSM network.

A cell site configuration database 150 stores configurations for the various network elements illustrated in FIG. 1. Current configuration data may be obtained from various network elements, including the SMLC/SMPC 112, the MSC VLR 114, the 3G MSC 138, the RNC 136, the E911 GMLC/MPC 124, the E911 LEC/PSAP 126, the Commercial LBS GMLC 116, etc. The cell site configuration database 150 may be used for provisioning various network elements and pushing configuration changes and updates to the network elements. The cell site configuration database 150 may also store and provide signature configuration data to the Emergency Location Audit and Repair System (ELARS) 160. The signature configuration data indicates how network elements within the network should be configured such that communications are routed and handled within the network for at least one of optimal performance, disaster recovery, and operation continuity, as described in further detail below.

According to an exemplary embodiment, the ELARS tool 160 audits the performance of various network elements by collecting current configuration data from the various network elements and collecting performance and fault data indicating a service quality of the network. Configuration data and performance and fault data may be collected via the cell site configuration database 150 and one or more operating support systems (OSSs) (not shown in the interest of simplifying the illustration). The ELARS tool 160 determines whether repairs are needed to various network elements based upon a comparison of the configuration data to a signature configuration and based on the fault and performance data. The ELARS tool 160 initiates configuration repairs to the network elements, as described in more detail below with reference to FIG. 2.

Figure 2:
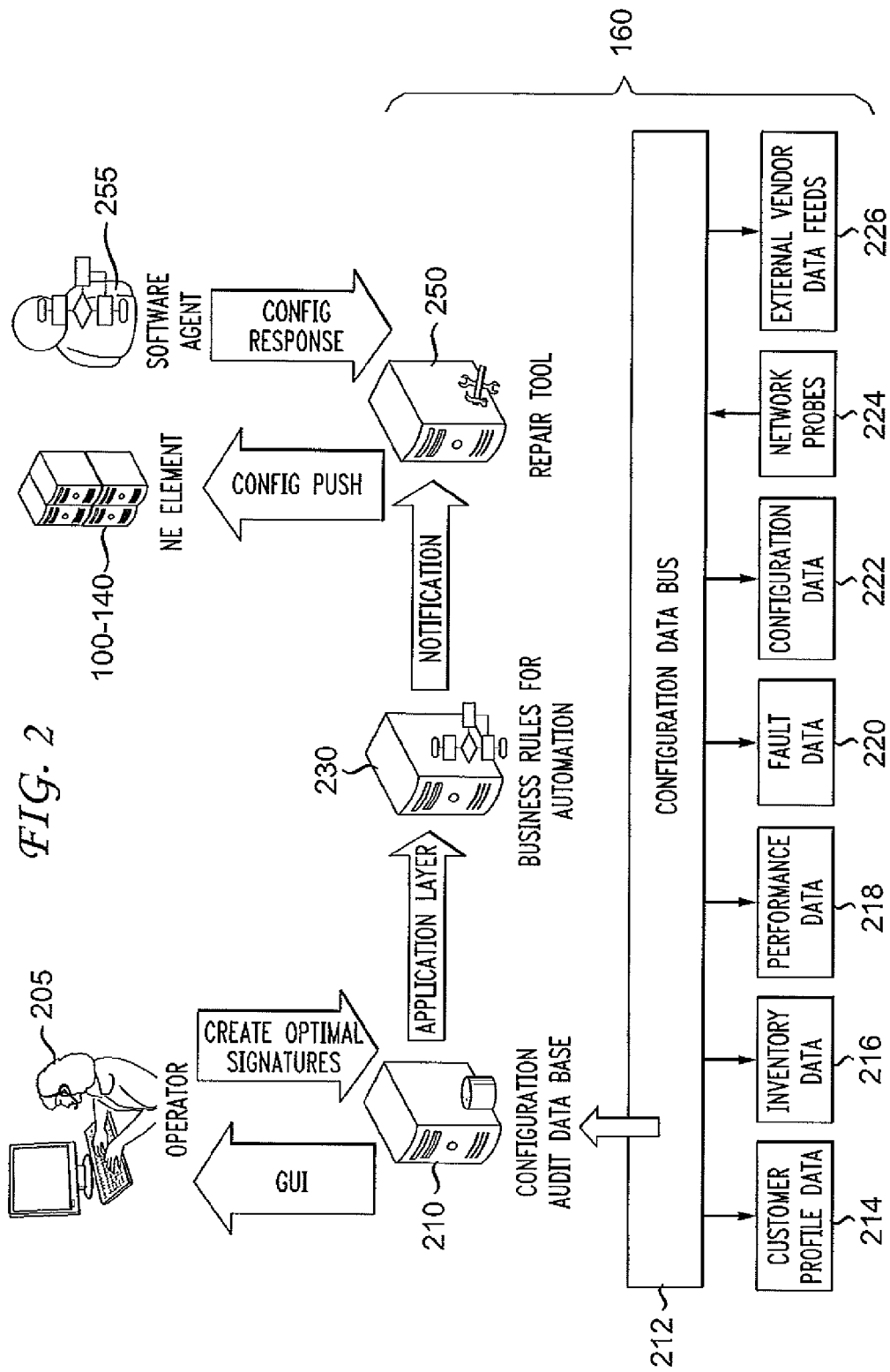
FIG. 2 illustrates a system for auditing and repairing a wireless network configuration according to exemplary embodiments.

Referring to FIG. 2, the ELARS tool 160 includes a configuration audit database 210 for receiving configuration data, a business rules tool 230 for comparing configuration data with a signature configuration and determining whether repairs are needed based on the comparison and based on received fault and performance data, and a repair tool 250 for initiating repairs when repairs are determined to be needed. Each of the components 210, 230, and 250 may be implemented as distinct devices, or the components may be incorporated into one device. An example of a device within which one or more of the components 210, 230, and 250 may be implemented is described in detail below with reference to FIG. 3.

The configuration audit database 210 receives E911/LBS valid signature configurations and current configuration data for all service topologies, technologies, and vendors, e.g., from vendor network elements, Operations Support Systems (OSSs), performance and fault systems, provisioning and inventory systems, such as the cell site configuration database 150 (illustrated in FIG. 1), and operation support services, including, e.g., an operator 205 utilizing a graphical user interface (GUI). An E911/LBS signature combines parameter settings for network elements from multiple data sources in order to define how an E911/LBS call should be routed and handled. Each specific mix of vendor, technology, protocol, and service class may have its own unique signature.

The configuration audit DB 210 retrieves data via a configuration data bus 212, which may be included within the ELARS tool 160. The retrieved data may be obtained by querying various data sources and may include customer profile data 214 from, e.g., a service provider, for building a complete customer profile, inventory data 216 from an inventory database including network-based inventory data, network topology, and logical and physical link data, performance data 218 from a performance OSS, fault data 220 from a fault OSS, configuration data 222 from a configuration OSS, and vendor data 226 from external vendors. The retrieved data may also include network probe data 224 retrieved by "listening" to a signaling system. The configuration data DB 210 may also receive additional data, e.g., call detail record (CDR) data, detailed network elements and support database configuration parameters, parameters for positioning algorithms for all technologies and phases, SS7 type Lb link information, SIGTRAN Lb link information, market topology as well as latitude/longitude information for all cell sites, other IP links from Operations, Administration and Maintenance/Management (OA&M) networks, and information regarding switch and router topology.

The business rules tool 230 compares at least one of multiple signature configurations with the current configuration and determines, based on the comparison and the fault and performance data, whether repairs and/or changes are needed. For the purposes of this disclosure, the terminology "repairs" may refer not only to repairs needed to a network configuration, but also to changes that may be needed to the configuration, e.g., to improve performance, provide operations continuity, and provide disaster recovery.

According to an exemplary embodiment, a signature configuration is a grouping of related parameter settings from multiple node types associated with various combinations of equipment and requirements (mandated and/or operational) within a heterogeneous telecommunications network. Signature configurations account for interdependencies between nodes where a certain parameter setting on one node impacts performance on other nodes. A signature configuration may be dependent on the vendor, model number or even vendor model software version of upstream and downstream nodes. Signature configurations may be modeled as multi-dimensional array (or similar) data types/classes. Multiple signature configurations may actually produce a desired outcome, though typically within an operator's network there will be a preferred (or golden) signature. According to an exemplary embodiment, additional signature configurations may be provided for contingencies for disaster recovery or business continuity (also referred to herein as operation continuity).

Sectors on a cell site may utilize significantly different signatures, in spite of having exactly the same equipment. For example, a sector servicing an area in which the PSAP has not requested Enhanced 911 service (Phase 0) may use a different signature configuration than a sector that services an area in which the PSAP which requires that latitude/longitude and caller information be provided through the ALI database 128 (Phase 2).

Referring again to FIG. 2, the repair tool 250 identifies and repairs network sectors including network elements with settings that do not conform to signature configurations. For example, the repair tool 250 identifies and repairs GSM sectors with settings which do not conform to required signatures by auditing network elements including, but not limited to, the MSC 114, the BSC 108, and the SMLC/SMPC (112). The repair tool also identifies and repairs UMTS sectors with settings which do not conform to required signatures by auditing network elements including but not limited to the 3G MSC 138, the RNC 136, the E911 GMLC/MPC 1224, the E911 LEC/PSAP 126, etc.

The repair tool 250 may push configuration changes to network elements needing repairs, e.g., the elements 100-140. As an alternative, the network elements may include software agents 255 that handle the configuration changes. In some embodiments, the software agents 255 allow the network elements to self-check and self-configure based on approval from the repair tool 250. This may depend on network element vendor support. Alternatively, the repair tool 250 can emulate a human operator and log on to the network element needing a repair to run a corrective script to update the configuration of the network element.

According to exemplary embodiments, configuration errors that deviate from a standard or signature configuration can be automatically detected and corrected. Signature configurations may be classified into various levels, including, for example: optimal signatures that are the best possible; valid signatures that are functionally correct but are not optimal (such as business continuity contingencies); and invalid signatures that result in incorrect location determination or protocol failures. Thus, a network sector may have multiple valid signatures, one of which may be designated as "optimal." Multiple valid signatures may be associated with a single location but may be ranked by priority/preference.

According to an exemplary embodiment, configuration parameter settings may be collected from all elements on the E911/LBS service topology path, and a logical map of the network may be created, e.g., by the business rules tool 230, such that there is a complete logical map of the physical topology of the connected elements. This allows automated validation of physical connections between elements by triggering alerts from faults on any physical links. Link failures can be automatically corrected via the repair tool 250 or can be sent to dispatch via auto-ticketing for manual repair, e.g., for problems that may not be automatically corrected.

Figure 3:
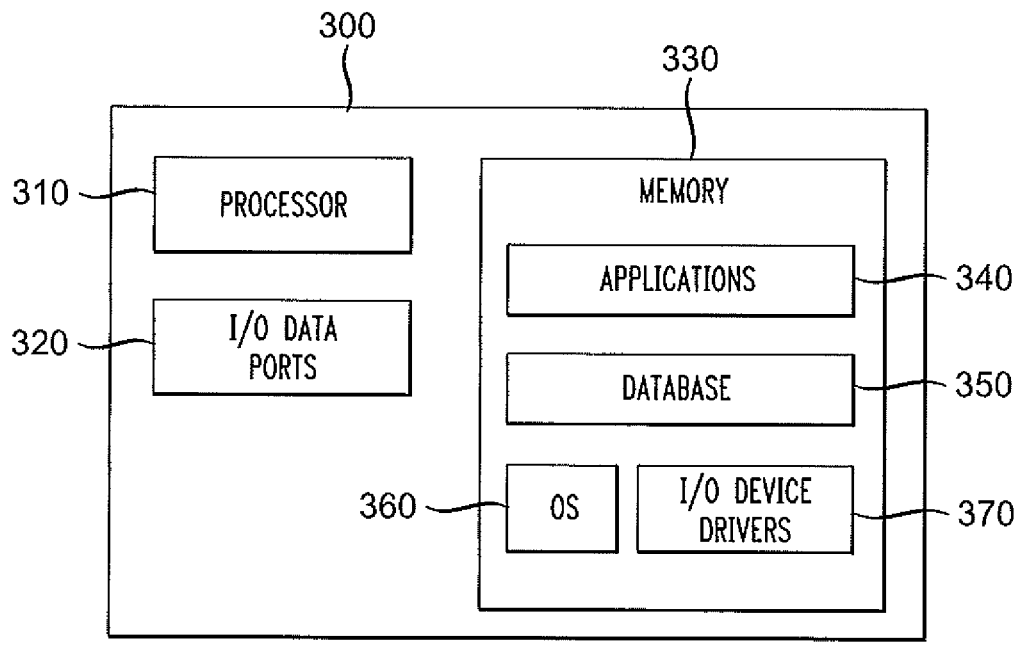
FIG. 3 illustrates a device with which a system for auditing and repairing a wireless network configuration may be implemented.

FIG. 3 is a block diagram of a device 300 with which a system for auditing and repairing a wireless network may be implemented according to an exemplary embodiment. The device 300 includes a processor 310 that receives information, such as configuration data representing an actual configuration of network elements, signature data representing a desired configuration of network elements, and performance and fault data, via I/O Data Ports 320. The I/O Data Ports 320 can be implemented with, e.g., an interface including an antenna or other suitable type of transceiver through which data and signals may be transmitted and received. It should be appreciated that the I/O Data Ports 320 can be used for communications between, e.g., an operator 205, a software agent 255, the various network elements 100-140, the cell site configuration database 150, OSSs, etc.

The processor 310 communicates with a memory 330 via, e.g., an address/data bus (not shown). The processor 310 can be any commercially available or customer processor. The memory 330 is representative of the overall hierarchy of memory devices containing the software and data used to implement the functionality of the device 300. The memory 330 can include, but is not limited to, the following types of devices: processor registers, processor cache, RAM, ROM, PROM, EPROM, EEPROM, flash memory, SRAMD, DRAM, other volatile memory forms, and non-volatile, semi-permanent or permanent memory types; for example, tape-based media, optical media, solid state media, hard disks, combinations thereof, and the like.

As shown in FIG. 3, the memory 330 may include several categories of software and data used in the device 300, including, applications 340, a database 350, an operating system (OS) 360, and the input/output (I/O) device drivers 370. As will be appreciated by those skilled in the art, the OS 360 may be any operating system for use with a data processing system. The I/O device drivers 370 may include various routines accessed through the OS 460 by the applications 340 to communicate with devices, and certain memory components. The applications 340 can be stored in the memory 330 and/or in a firmware (not shown) as executable instructions, and can be executed by the processor 310. The applications 340 include various programs that, when executed by the processor 310, implement the various features of the device 300, including an application for comparing a signature configuration to a current configuration and determining whether repairs are needed based on the comparison and received fault and performance data. The applications 340 may be applied to data stored in the database 350, along with data, e.g., received via the I/O data ports 320. The database 350 represents the static and dynamic data used by the applications 340, the OS 360, the I/O device drivers 370 and other software programs that may reside in the memory. The database 350 may include, for example, signature configuration data, etc.

While the memory 330 is illustrated as residing proximate the processor 310, it should be understood that at least a portion of the memory 330 can be a remotely accessed storage system, for example, a server on a communication network, a remote hard disk drive, a removable storage medium, combinations thereof, and the like. Thus, any of the data, applications, and/or software described above can be stored within the memory 330 and/or accessed via network connections to other data processing systems (not shown) that may include a local area network (LAN), a metropolitan area network (MAN), or a wide area network (WAN), for example.

It should be understood that FIG. 3 and the description above are intended to provide a brief, general description of a suitable environment in which the various aspects of some embodiments of the present disclosure can be implemented. While the description refers to computer-readable instructions, embodiments of the present disclosure also can be implemented in combination with other program modules and/or as a combination of hardware and software in addition to, or in stead of, computer readable instructions. The term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, handheld computing devices, microprocessor-based, programmable consumer electronics, combinations thereof, and the like.

Figure 4:
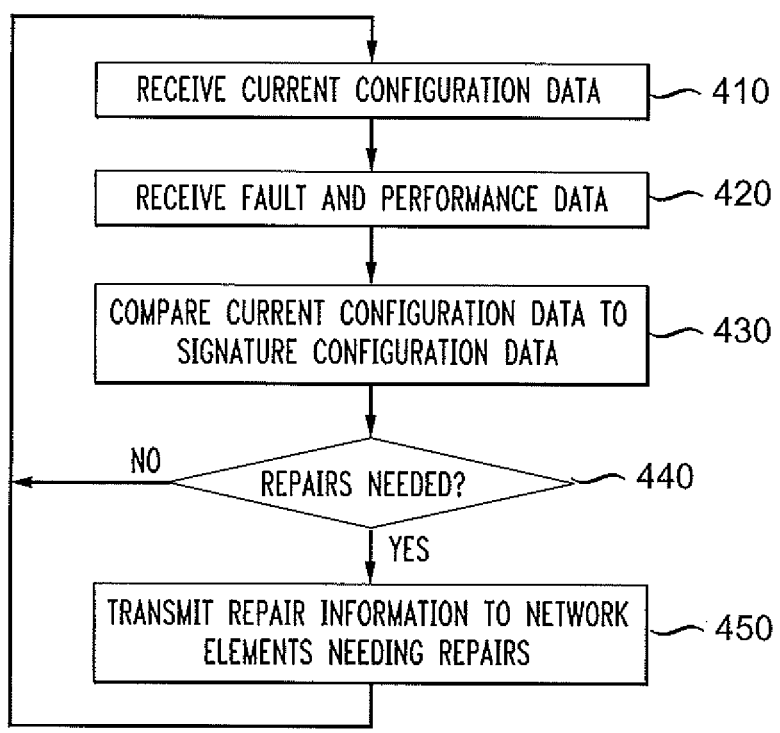
FIG. 4 illustrates a method for auditing and repairing a wireless network configuration according to an exemplary embodiment.

FIG. 4 illustrates a method for auditing and repairing a network configuration according to an exemplary embodiment. It should be understood that the steps or other interactions of the illustrated method are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the method can be ended at any time. In certain embodiments, some or all steps of the method, and/or substantially equivalent steps can be performed by execution of computer-executable instructions stored or included on a non-transitory computer-readable medium.

At step 410, current configuration data is received from network elements, e.g., network elements 100-140 and databases of records, e.g., database 150, at the ELARS system 160. The current configuration data indicates how communications are routed and handled within the network. At step 420, fault and performance data is received from network elements 100-140 and Operations Support Systems (not shown in the interest of simplifying the illustration) at the ELARS system 160. The fault and performance data represents a current level service quality of the network. The ELARS system 160 compares the current configuration data to a signature configuration of the network at step 430. The signature configuration represents how network elements should be configured within the network for handling and routing communications for optimal performance, disaster recovery, and/or business continuity contingencies. At step 440, the ELARS system 160 determines, based on the comparison and the collected fault and performance data, whether repairs are needed to the current configuration of the network. If repairs are not needed, the process may return to step 410 such that the network is continually audited. If repairs are needed, the ELARS tool 160 transmits repair information to the network elements 100-140 needing repairs at step 450. From step 450, the process returns to step 410, and network configuration auditing continues.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A method for auditing and repairing a configuration of a wireless telecommunications network, the method comprising:

receiving current configuration data representing the configuration of the network, the current configuration data indicating how network elements are configured within the network for routing and handling communications;

receiving fault and performance data representing a current level of service quality of the network;

comparing, by a processor, the current configuration data to a signature configuration of the network, the signature configuration representing how the network elements should be configured within the network such that communications are routed and handled for at least one of optimal performance, disaster recovery, and operation continuity, wherein the signature configuration includes a grouping of related parameter settings associated with the network elements, wherein the signature configuration accounts for interdependencies between the network elements in cases in which a particular parameter setting associated with one network element impacts performance of another network element, wherein there are multiple signature configurations for the network including at least one optimal configuration and at least one less-than-optimal but valid configuration and wherein the current configuration data is compared to the multiple signatures for the network, including the at least one optimal configuration and the at least one less-than-optimal but valid configuration, based on a mandated level of service quality;

determining, by the processor, whether repairs are needed to the configuration of the network based on the comparison and the fault and performance data, wherein determining whether repairs are needed comprises:

determining based on a collected fault and performance data, an extent to which the service quality degraded;

determining whether the configuration is optimal, valid but less-than-optimal, or invalid; and determining that the repairs are needed when the configuration is less-than-optimal but valid or when the configuration is invalid, depending on the extent to which the service quality has degraded with respect to the mandated level of service quality; and providing repair information for the network elements within the network needing repairs based on the determination that repairs are needed to the configuration.

2. The method of claim 1, further comprising transmitting the repair information to the network elements within the network needing repairs.

3. The method of claim 1, further comprising creating a logical map of physical connections between the network elements within the network based on the current configuration data for automatic triggering of repairs of the physical connections when repairs to the configuration are determined to be needed.

4. The method of claim 1, wherein the network provides emergency communication services and location-based communication services to mobile devices.

5. A device for auditing and a configuration of a wireless telecommunications network, comprising:

a processor; and a memory having instructions stored thereon on which, when executed by the processor, cause the processor to perform operations comprising:

comparing current configuration data representing the configuration of the network, the current configuration data indicating how network elements are configured within the network for routing and handling communications, to a signature configuration of the network, the signature configuration representing how the network elements should be configured within the network such that communications are routed and handled for at least one of optimal performance, disaster recovery, and operation continuity, wherein the signature configuration includes a grouping of related parameter settings associated with the network elements, wherein the signature configuration accounts for interdependencies between the network elements in cases in which a particular parameter setting associated with one network element impacts performance of another network element, wherein there are multiple signature configurations for the network including at least one optimal configuration and at least one less-than-optimal but valid configurations, and wherein the current configuration data is compared to the at least one optimal configuration and the at least one less-than-optimal but valid configuration based on a mandated level of service quality;

determining, based on the comparison and collected fault and performance data representing a current level of service quality of the network, whether repairs are needed to the configuration of the network, wherein determining whether repairs are needed comprises:

determining based on the collected fault and performance data, an extent to which the service quality has degraded;

determining whether the configuration is optimal, valid but less-than-optimal, or invalid; and determining that the repairs are needed when the configuration is less-than-optimal but valid or when the configuration is invalid, depending on the extent to which the service quality has degraded with respect to the mandated level of service quality; sand providing repair information for the network elements within the network needing repairs based on the determination that repairs are needed to the configuration.

6. The device of claim 5, wherein the memory further has instructions stored thereon which, when executed by the processor, cause the processor to initiate transmission of repair information to the network elements within the network needing repairs.

7. The device of claim 5, wherein the memory further has instructions stored thereon which, when executed by the processor, cause the processor to create a logical map of physical connections between the network elements within the network based on the current configuration data for automatic triggering of repairs of the physical connections when repairs to the configuration are determined to be needed.

8. The device of claim 5, wherein the network provides emergency communication services and location-based communication services to the network elements.

9. A computer program product including a non-transitory storage device upon which instructions are recorded that, when executed by a processor, cause the processor to perform operations for auditing and repairing a configuration of a wireless telecommunications network, the operations comprising:

comparing current configuration data representing the configuration of the network, the current configuration data indicating how network elements are configured within the network for routing and handling communications, to a signature configuration of the network, the signature configuration representing how the network elements should be configured within the network such that communications are routed and handled for at least one of optimal performance, disaster recovery, and operation continuity, wherein the signature configuration includes a grouping of related parameter settings associated with the network elements, wherein the signature configuration accounts for interdependencies between the network elements in cases in which a particular parameter setting associated with one network element impacts performance of another network element, wherein there are multiple signature configurations for the network including at least one optimal configuration and at least one less-than-optimal but valid configuration, and wherein the configuration data of the network is compared to the at least one optimal configuration and the at least one less-than-optimal but valid configuration based on a mandated level of service quality;

determining, based on the comparison and collected fault and performance data representing a current level of service quality of the network, whether repairs are needed to the configuration of the network, wherein determining whether repairs are needed comprises:

determining based on the collected fault and performance data, an extent to which the service quality degraded;

determining whether the configuration is optimal, valid but less-than-optimal, or invalid; and determining that the repairs are needed when the configuration is less-than-optimal but valid or when the configuration is invalid, depending on the extent to which the service quality has degraded with respect to the mandated level of service quality; and providing repair information for the network elements needing repairs based on the determination that repairs are needed to the configuration.

10. The computer program product of claim 9, wherein the instructions, when executed by the processor, further cause the processor to initiate transmission of repair information to the network elements within the network needing repairs.

11. The computer program product of claim 9, wherein the instructions, when executed by the processor, further cause the processor to create a logical map of physical connections between the network elements within the network based on the current configuration data for automatic triggering of repairs of the physical connections when repairs to the configuration are determined to be needed.

12. The computer program product of claim 9, wherein the network provides emergency communication services and location-based communication services to mobile devices.

* * * * *